United States Patent

Boorujy

[15] 3,677,413
[45] July 18, 1972

[54] TERTIARY FILTERING ARRANGEMENT

[72] Inventor: Salem Boorujy, Chatham, N.J.

[73] Assignee: Environmental Sciences, Inc., Berkeley Heights, N.J.

[22] Filed: Dec. 28, 1970

[21] Appl. No.: 102,103

Related U.S. Application Data

[62] Division of Ser. No. 855,626, Sept. 5, 1969, Pat. No. 3,574,098.

[52] U.S. Cl..............................................210/502, 162/4
[51] Int. Cl.........................................................B01d 39/00
[58] Field of Search..........162/4, 6; 210/62, 72, 75, 500–503

[56] References Cited

UNITED STATES PATENTS

| | | |
|---|---|---|
| 1,937,481 | 11/1933 | Raisch et al..........................210/75 X |
| 2,046,845 | 7/1936 | Raisch..................................210/75 X |
| 3,037,635 | 6/1962 | Boorujy................................210/75 X |
| 3,574,098 | 4/1971 | Boorujy....................................210/62 |

Primary Examiner—Reuben Freidman
Assistant Examiner—R. W. Burks
Attorney—Howard R. Popper

[57] ABSTRACT

A method of preparing material for use in purifying water is disclosed. The material is advantageously processed from used, waste newsprint by grinding it until it will pass through a 70–80 mesh screen, cleaning the ground newsprint with solvent to remove residual oil, scorching the cleaned newsprint and then regrinding to a fineness that will pass through a 400-mesh screen. The material when added to water to be purified reduces the BOD content of the water being treated.

2 Claims, 1 Drawing Figure

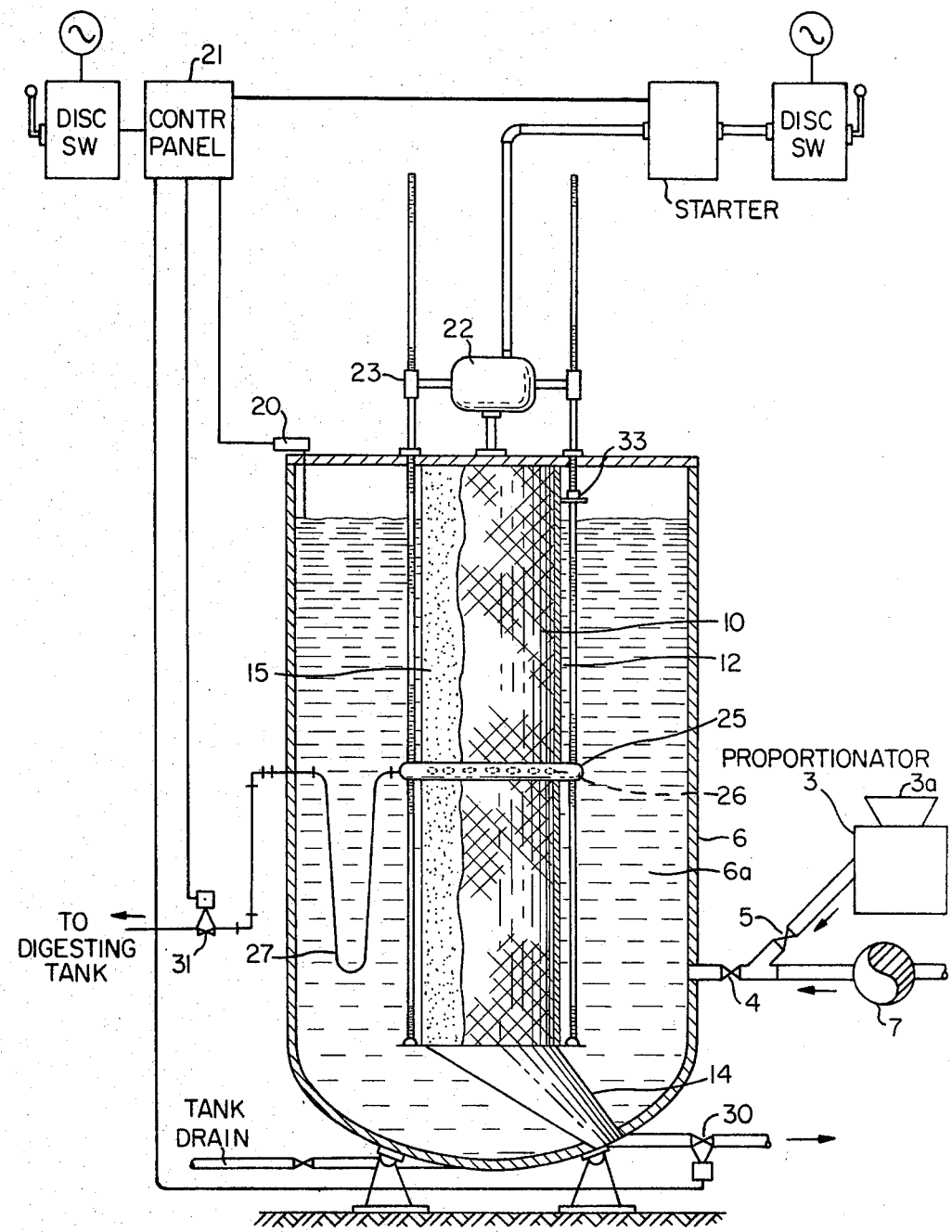

TERTIARY FILTERING ARRANGEMENT

This application is a division of patent application, Ser. No. 855,626, filed Sept. 5, 1969, now U.S. Pat. No. 3,574,098.

BACKGROUND OF THE INVENTION

This invention relates to the purification of water, and more particularly, to a process and apparatus applicable to the third or tertiary stage of the purification procedures employed in rendering sewer effluent suitable for discharge into rivers and streams without polluting the same.

The purification of sewer water may encompass three stages, the first or primary of which involves the use of a settling tank or basin which involves the use of a settling tank or basin which allows solid matter and large particles to settle out. The secondary stage employs a trickling filter in the nature of a stone, sand, or plastic particle bed which captures smaller particles carried in the effluent. After passing through the secondary filtration beds, sewer water is still not suitable for discharge into rivers and streams because of the suspended particulate matter which, because of its high oxygen demand, will disturb the natural ecology of such waterways. These suspended particles are generally too fine to be removed by most filter beds and tend to rapidly clog filtering apparatus that would otherwise be capable of removing them from solution. Heretofore, filtering arrangements have been known which have employed activated carbon or diatomaceous earth in removing particulate material at the third stage of water purification processes, but the use of such materials entails considerable cost.

I have discovered that suitably prepared waste newsprint may be utilized to remove suspended particulate material having a high biological oxygen demand from sewer water which has undergone primary and secondary purification. I have found that by first powdering such waste newsprint in a hammer mill, then scorching the powdered newsprint in a rotary kiln until it is a brown or cocoa color, then washing the scorched newsprint in perchloroethylene or other solvent to remove the residual oils retained in the dried ink of the newsprint, by further grinding the cleaned and scorched newsprint to a particle size that will pass through a 400 mesh screen and by then introducing this processed newsprint into the sewer water at the rate of approximately 100 to 200 pounds to one million gallons of domestic sewage, containing approximately 250 parts per million biological oxygen demand particles (ppm B.O.D.s), that 95 percent of such B.O.D.s will be removed at a rate sufficient to meet the practical demands of a functioning municipal sewage disposal system.

The foregoing and other objects and features will become apparent from the ensuing description and drawing, the single FIGURE of which depicts a filtering apparatus for purifying water by employing the processed newsprint of the present invention.

DESCRIPTION OF TERTIARY FILTERING APPARATUS

Referring now to the drawing, there is shown a tertiary filtering unit constructed according to the present invention. Water which has undergone primary and secondary treatment, i.e., which has been passed through a settling tank and a stone filter bed, is pumped into closed tank 6 through pipe 4. While the dimensions of the tank may be varied to suit particular installations, it is envisioned that a 3-foot diameter tank, approximately 5 feet tall would contain sufficient volume to process approximately 1,200 gallons per hour or 28,800 gallons per day of domestic sewage. Where a greater throughput of sewage is needed, it will be apparent that larger units may be employed, or alternatively, a number of small units may be utilized in tandem. Processed waste newsprint is introduced into pipe 4 via a feed line 5 and the mixture of water to be treated and a slurry of processed newsprint under the force imparted by the pump 7 enters tank 6.

The correct proportion of newsprint to sewer water is established by regulating the rotational speed of a proportionating wheel (not shown) of proportionator 3 whose buckets scoop up the newsprint from the hopper 3a. The use of such a proportionator for introducing powdered material into a liquid stream being well known, it will not be described herein. I have found that a proportion of 100 to 200 pounds of processed newsprint per million gallons of influent has been satisfactory in accomplishing the desired purification of domestic sewage. A correspondingly greater amount of processed newsprint is needed to purify industrial sewage in which the B.O.D. content is higher. As will be apparent to those skilled in the art, the desired degree of purification may be verified by taking a sample of the water after it has been passed through the filtering apparatus, and making a conventional culture test.

Within tank 6 there is a central core 10 which may be in the form of a wire screen or perforated cylinder of suitable corrosion-resistant material, such as stainless steel. The central core or screen, in one illustrative embodiment, may have ¼-inch square or round apertures. Positioned externally to the central core is a filter media 12 which advantageously may be formed from a roll of felted filter material having a thickness of approximately one-fourth inch and having a porosity which is adapted to pass approximately 25 cubic feet per minute of air per square foot at a pressure of 8 ounces per square inch or, what is the same thing, 50 gallons of water per hour per square foot. Material having these properties may be of wool, orlon, or teflon felt and is available from many manufacturers, including the American Felt Company. The pressure of the water in the tank causes penetration of the filter media and central core, and the water enters discharge funnel 14, from which the effluent may be discharged into a river or stream.

The action of the processed powdered newsprint is such that it will remove suspended solids and organic materials from the influent, such materials depositing themselves on the surface 15 of filter media 12. The build-up of the deposit on surface 15 increases the pressure differential between the liquid in the outer portion 6a of tank 6 and that within the discharge funnel 14. Pressure sensing device 20, which advantageously may be set to respond when the pressure differential reaches 10 pounds per square inch, provides a signal to control panel 21. Control panel 21, responding to the signal from pressure probe 20, shuts valve 30, preventing the discharge of effluent from funnel 14, opens valve 31 in ventable cleaning line 27, and sets drive motor 22 into operation. Drive motor 22, via drive train 23, causes cleaning scraper ring 25 to commence travelling along the outside of filter media 12 to clean the surface 15 of the deposits, causing the detected pressure differential. Cleaning ring 25 is advantageously fabricated to be in the form of a hollow torroid with apertures or slots 26 on its inner circumference. The deposits enter the apertures 26 of cleaning ring 25 and are carried away through cleaning line 27 to a digesting tank (not shown).

The cleaning action of ring 25 will thus be observed to be unique in that it cleans the external surface 15 of the filter media under the back pressure of the already filtered water which is inside the central core. This cleaner water in the central core, which is under approximately 10 pounds pressure, finds a vent to the atmosphere through open valve 31 over a path which is travelled in the direction from the inside of the central core through the filter media, the apertures 26 of the cleaning ring 25, and the cleaning line 27 to the digesting tank which is at atmospheric pressure.

When surface 15 has been cleaned, valve 31 is closed, valve 30 is opened, and drive motor 22 is deenergized by control panel 21. As will be apparent, the cleaning operation may be terminated after the ring has been caused to pass over the entire length of the filter media 12, either once or as many times as is found desirable under given operating conditions. By suitable connection (not shown) to central panel 21, a conventional limit switch 33 may advantageously be employed to reverse the direction in which cleaning ring 25 is driven by drive motor 22 when the ring has traversed the length of the surface 15.

MANNER OF PROCESSING WASTE NEWSPRINT

The powdered newsprint, which has been found efficacious in cleaning sewer water having biological oxygen demand, is advantageously manufactured by the following process.

The waste newsprint is first powdered in a hammer mill of conventional design to a fineness that will pass through a 75-80 mesh screen. The material which passes through this screen is then subjected to a perchloroethylene bath to remove the residual oils which are customarily employed in manufacturing the printers ink which is on the newspaper. In this regard it is important to appreciate that the present invention, in one of its aspects, requires waste newsprint which has actually been printed upon. This is because it is believed that certain of the chemicals, albeit in small proportion, that are found in the printers ink, and also these chemicals which are found in the type of paper customarily used as newsprint, are efficacious in chemically attacking the suspended B.O.D.s. For example, in bleaching the newsprint so that it is sufficiently white to be acceptable for newspaper purposes, there is caused to remain approximately 5 parts per million of chlorine in the paper. In the printers ink there also may be of the order of 3 parts per million of iron chloride which also is believed to play a part in the oxidation and precipitation of the suspended B.O.D.s in the sewer water. There is also a certain amount of residual oil in the printers ink, but it is absolutely essential that this oil be removed as otherwise the powdered newsprint will form a colloid with the suspended B.O.D.s and prevent their precipitation on the surface 15 of the filter media 12. Accordingly, the powdered newsprint passing through the 75-80 mesh screen is washed with perchloroethylene to remove this trace of oil from the printers ink.

The powdered, de-oiled newsprint is then scorched to a brown or cocoa color, advantageously, in a rotary kiln of the type similar to that employed in calcining. The scorching opens the fibers of the powdered newsprint and provides a degree of activated carbonization. However, the carbonization cannot be allowed to progress too far or the iron chloride and chlorine traces mentioned previously will be destroyed. Scorching is also essential so that the next grinding process can proceed to the desired degree of fineness. The second grinding process which is now carried on is also performed in a hammer mill and is continued until the newsprint will pass through a 400 mesh screen. The material passing through the 400 mesh screen is then suitable for mixing with the sewer influent as described above.

The foregoing is descriptive of the illustrative embodiment and process of the present invention. Numerous modifications thereof will be apparent to those skilled in the art without departing from the spirit and scope of the invention.

What is claimed is:

1. A method of preparing a material for use in purifying water comprising grinding waste newsprint until it will pass through a 70-80 mesh screen, cleaning said newsprint with solvent to remove residual oil therefrom, scorching said cleaned newsprint and regrinding said scorched newsprint to a fineness that will pass a 400 mesh screen.

2. An additive for use in the clarification of liquids having particulate matter suspended therein comprising finely ground and scorched oil-free waste newsprint.

* * * * *